(12) United States Patent  
Nuss et al.

(10) Patent No.: US 12,298,408 B2  
(45) Date of Patent: May 13, 2025

(54) SYSTEM AND METHOD FOR VALIDATION OF LIDAR-GENERATED HORIZON ESTIMATION

(71) Applicant: Luminar Technologies, Inc., Orlando, FL (US)

(72) Inventors: Dominik Nuss, Palo Alto, CA (US); Masood Taheri, San Jose, CA (US); Amey Sutavani, Mountain View, CA (US); Scott Walter, Palo Alto, CA (US); Scott Ryvola, San Jose, CA (US); Mohamed Ahmad, Vienna, VA (US); Flavian Pegado, Mountain View, CA (US); Shubham C. Khilari, Palo Alto, CA (US); Vahid R. Ramezani, Los Altos, CA (US)

(73) Assignee: Luminar Technologies, Inc., Orlando, FL (US)

( * ) Notice: Subject to any disclaimer, the term of this patent is extended or adjusted under 35 U.S.C. 154(b) by 206 days.

(21) Appl. No.: 18/079,385

(22) Filed: Dec. 12, 2022

(65) Prior Publication Data

US 2024/0192377 A1 Jun. 13, 2024

Related U.S. Application Data

(60) Provisional application No. 63/305,500, filed on Feb. 1, 2022.

(51) Int. Cl.  
*G01C 21/00* (2006.01)  
*G01S 17/86* (2020.01)  
*G01S 17/931* (2020.01)

(52) U.S. Cl.  
CPC ........ *G01S 17/931* (2020.01); *G01C 21/3822* (2020.08); *G01S 17/86* (2020.01)

(58) Field of Classification Search  
CPC ... G01S 17/931; G01S 17/86; G01C 21/3822; G01C 21/1652; G01C 21/28  
USPC ............... 356/5.02, 4.01, 5.01, 28, 606–608  
See application file for complete search history.

(56) References Cited

U.S. PATENT DOCUMENTS

| | | | | |
|---|---|---|---|---|
| 2014/0368651 A1* | 12/2014 | Irschara | ................... | G06T 7/80 |
| | | | | 348/148 |
| 2017/0277195 A1* | 9/2017 | Frazzoli | .......... | B60W 60/00276 |
| 2019/0120946 A1* | 4/2019 | Wheeler | ................... | G06T 7/13 |
| 2021/0347378 A1* | 11/2021 | Nabatchian | ............ | G06V 20/56 |

* cited by examiner

*Primary Examiner* — Isiaka O Akanbi  
(74) *Attorney, Agent, or Firm* — Van Pelt, Yi & James LLP

(57) ABSTRACT

A system and method are described for assessing accuracy of a virtual horizon generated by a vehicle-based lidar system as the vehicle traverses a route of travel. Travel route topology data is obtained by a vehicle vehicle-mounted global positioning system-assisted inertial measurement unit (GPS/IMU) data. A reference virtual horizon at points along the route of travel is obtained from the GPS/IMU data and is compared with the virtual horizon generated by the lidar system for the same points to assess the accuracy of the virtual horizon generated by the lidar system.

21 Claims, 11 Drawing Sheets

SYSTEM AND METHOD FOR VALIDATION OF LIDAR-GENERATED HORIZON ESTIMATION

CROSS REFERENCE TO RELATED APPLICATION

This application claims priority under 35 U.S.C. § 119 based on U.S. Provisional Application No. 63/305,500, filed on Feb. 1, 2022, the disclosure of which is hereby incorporated by reference herein.

TECHNICAL FIELD

This disclosure generally relates to imaging systems that estimate location of an actual horizon in the field of view of the imaging system. In particular, the disclosure relates to assessing horizon estimations based on analysis of images obtained by an imaging system mounted on a vehicle by comparison with a vehicle-mounted global positioning system-assisted inertial measurement unit (GPS/IMU) data for a route traversed by the vehicle.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Self-driving or "autonomous" vehicles generally employ imaging sensors, such as light detection and ranging (lidar) devices, to detect or "see" the surrounding environment as the vehicles move toward their destinations. Such vehicles include control systems that process the sensor data and, based on both the sensed environment and the desired destination, determine which maneuvers and operational parameters (e.g., speed, braking force, steering direction) are most appropriate on a more or less continuous basis throughout the trip. The autonomous vehicles seek not only to arrive at the desired destination, but also to maintain the safety of both the autonomous vehicle passengers and any individuals who may be in the general vicinity of the autonomous vehicles.

Achieving this goal is a formidable challenge, largely because an autonomous vehicle is surrounded by an environment that can rapidly change, with a wide variety of objects (e.g., other vehicles, pedestrians, stop signs, traffic lights, curbs, lane markings, etc.) potentially being present at a variety of locations/orientations relative to the vehicle. An imaging sensor that senses a portion of the environment in a fixed orientation to the vehicle may collect data that significantly over-represents a road region or a sky region that have limited contributions determining maneuvers and operational parameters.

In order to collect data that is most relevant to assessing the safety concerns ahead of a vehicle, it may be necessary to determine where the horizon lies ahead of the vehicle. This determination may be made as an angle relative to a neutral angle of the vehicle, which may correspond, for example, to a horizontal plane through the center of the axles of the vehicle. On a flat roadway, the angle between the actual horizon and the neutral angle of the vehicle would be zero degrees at an infinite distance from the vehicle. At closer ranges, the "horizon", i.e., a point on the road surface at a specific distance from the vehicle would be at a negative vertical angle relative to the neutral angle of the vehicle. Assessing the accuracy of horizon determinations made by an imaging system mounted on the vehicle in various terrains and roadway conditions is critical to the overall ability of the imaging system to continually track the most relevant portions of the field of regard of the imaging system throughout the travel route traversed by the vehicle.

DETAILED DESCRIPTION

Figure 1:
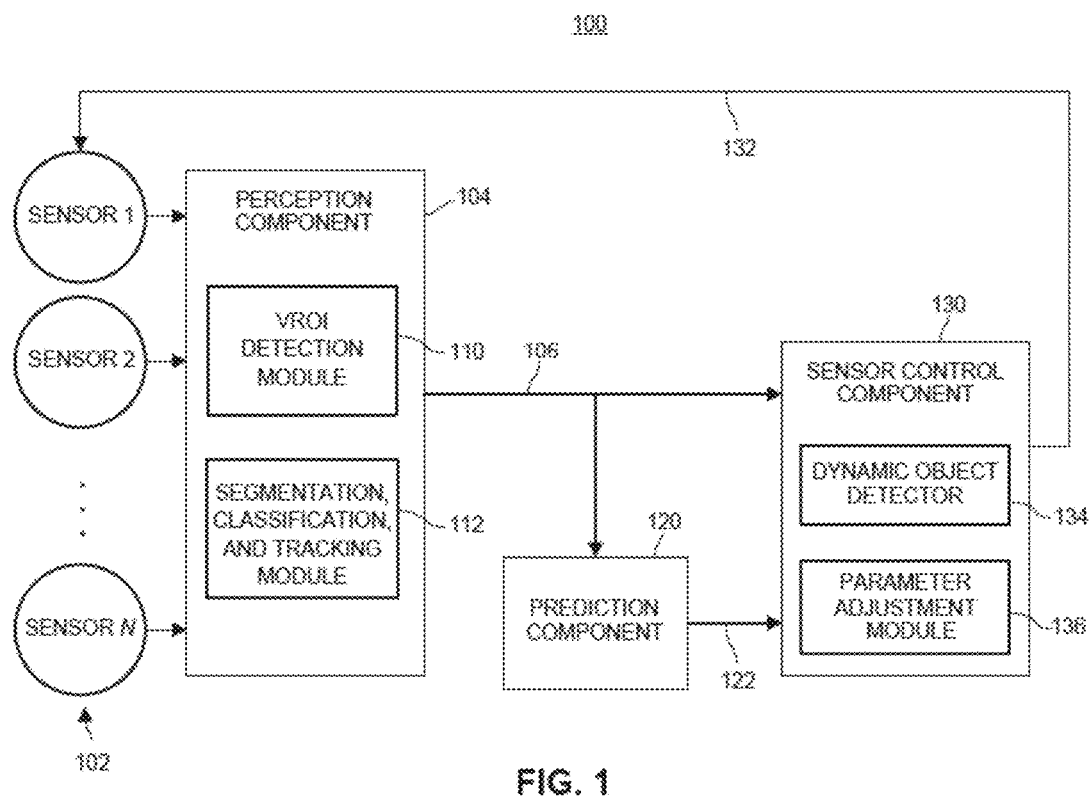
FIG. 1 is a block diagram of an example system for controlling parameters of one or more vehicle sensors based on detecting a vertical region of interest (VROI) in the vehicle's environment.

According to the techniques of this disclosure, an imaging system can generate an estimate for the virtual horizon for a moving vehicle and control parameters of vehicle sensors, and/or to process data generated by such sensors, in view of the estimate of the virtual horizon. The estimate of the virtual horizon can correspond to lower and higher boundaries of a region within a field of regard of the vehicle sensors, such that the virtual horizon is between the lower and the higher boundaries. The estimate of the virtual horizon may include sensor data indicating vehicle attitude including vehicle pitch.

The vehicle may be a fully self-driving or "autonomous" vehicle, a vehicle controlled by a human driver, or some combination of autonomous and operator-controlled components. For example, the disclosed techniques may be used to capture vehicle environment information to improve the safety/performance of an autonomous vehicle, to generate alerts for a human driver, or simply to collect data relating to a particular driving trip (e.g., to record how many other vehicles or pedestrians were encountered during the trip, etc.). The sensors may be any type or types of sensors capable of sensing an environment through which the vehicle is moving, such as lidar, radar, cameras, and/or other types of sensors. The vehicle may also include other sensors, such as gyroscopes, inertial measurement units (IMUs), and/or include other types of devices that provide information on the current position and attitude of the vehicle (e.g., a GPS unit).

The sensor data (and possibly other data) is processed by a perception component of the vehicle, which outputs signals indicative of the current state of the vehicle's environment. For example, the perception component may identify positions of (and in some instances classify and/or track) objects within the vehicle's environment. As a more specific example that utilizes lidar or radar data, the perception component may include a segmentation module that partitions lidar or radar point clouds into subsets of points that correspond to probable objects, a classification module that determines labels/classes for the subsets of points (segmented objects), and a tracking module that tracks segmented and/or classified objects over time (i.e., across subsequent point cloud frames).

The imaging system can adjust one or more parameters of the sensors based on various types of information and/or criteria. In some embodiments, the imaging system controls parameters that determine the area of focus of a sensor. For example, the imaging system can adjust the center and/or size of a field of regard of a lidar or radar device, and/or modify the spatial distribution of scan lines (e.g., with respect to elevation angle) produced by such a device to focus on particular types of objects, particular groupings of objects, particular types of areas in the environment (e.g., the road immediately ahead of the vehicle, the horizon ahead of the vehicle, etc.), and so on. For some implementations in which scan line distributions can be controlled, the imaging system can cause the sensor to produce scan lines arranged according to a sampling of a continuous mathematical distribution, such as a Gaussian distribution with a peak scan line density that covers the desired area of focus, or a multimodal distribution with peak scan line densities in two or more desired areas of focus. Moreover, in some implementations and/or scenarios, the imaging system can position scan lines according to an arbitrary distribution. For example, the imaging system can position scan lines to achieve a desired resolution for each of two or more areas of the environment (e.g., resulting in a 2:4:1 ratio of scan lines covering an area of road immediately ahead of the vehicle, to scan lines covering an area that includes the horizon, to scan lines covering an area above the horizon).

In some implementations, the imaging system determines the area of focus using a heuristic approach, as represented by various rules, algorithms, criteria, etc. For example, the imaging system can determine the area of focus based on the presence and positions of "dynamic" objects, or particular types of dynamic objects, within the environment. The presence, positions and/or types of the dynamic objects may be determined using data generated by the sensor that is being controlled, and/or using data generated by one or more other sensors on the vehicle. For example, a camera with a wide-angle view of the environment may be used to determine a narrower area of focus for a lidar device. As an alternative example, the imaging system can initially configure a lidar device to have a relatively large field of regard, and later be set to focus on (e.g., center a smaller field of regard upon) a dynamic object detected in a specific portion of the larger field of regard.

As another example, the imaging system can analyze the configuration of the road ahead of the vehicle for purposes of adjusting the field of regard of a sensor (e.g., lidar, camera, etc.). In particular, the elevation angle of the field of regard (e.g., the elevation angle of the center of the field of regard) may be adjusted based on the slope of one or more portions of the road and the attitude of the vehicle. The slope of the road portion currently being traversed by the vehicle may be determined with similar sensors, and/or may be determined using one or more other devices (e.g., an IMU). The attitude of the vehicle may be determined by these sensors or may be determined by or augmented with data from a gyroscope or other devices, including but not limited to an IMU. The overall road configuration may be determined using a fusion of multiple sensor types, such as IMU(s), lidar(s) and/or camera(s), and/or using GPS elevation data, for example. In some embodiments, the position of the field of regard can also be adjusted in a horizontal/lateral direction based on the road configuration, e.g., if the road ahead turns to the right or left. The adjustments to the field of regard may be made with the goal of satisfying one or more predetermined visibility criteria. For example, the field of regard may be centered such that, given the slope(s) of the road ahead and the range constraints of the sensor, visibility (i.e., sensing distance) is maximized. If no center position of the field of regard can result in the sensor having some minimum threshold of visibility, the speed of the vehicle may be automatically decreased. The capability to change at least the elevation angle of the field of regard can avoid scenarios in which the sensor is overly focused on the road surface just a relatively short distance ahead of the vehicle (when driving downhill), or overly focused on the sky (when driving uphill), for example. The vertical and/or horizontal adjustments to the field of regard may occur by controlling the orientation of one or more components within the sensor (e.g., one or more mirrors within a lidar device), or in another suitable manner (e.g., by mechanically adjusting the vertical and/or horizontal orientation of the entire sensor).

Other heuristic approaches are also possible, instead of, or in addition to, the approaches described above. For example, the area of focus may be set based on the position of the horizon relative to the vehicle, the position of a nearest or furthest object from the vehicle (irrespective of whether it is a dynamic object), a level of uncertainty with respect to the classification of a particular object, and/or one or more other factors.

It can be advantageous to set the area of focus based on sensor data, but without relying on segmentation or classification of objects. In some implementations, the imaging system can combine heuristic algorithms operating directly on subsets of sensor data to determine an appropriate area of focus with suitable precision. For example, one heuristic algorithm may be used to determine, based on processing sensor data points prior to segmentation, a lower estimate of an elevation angle (with respect to the sensor) of the horizon. Another heuristic algorithm may be used to determine, based on processing sensor data points prior to segmentation, an upper estimate of an elevation angle (with respect to the sensor) of the horizon. The imaging system may set the upper and lower horizon estimates and may, correspondingly, set upper and lower bounds of a vertical region of interest (VROI). The imaging system may designate a virtual horizon within the VROI. The virtual horizon may indicate a horizon elevation line in the absence of certain obscuring elements (e.g., hills, tree lines, other vehicles) within a driving environment, or a suitable vertical look direction approximately separating horizontal surface elements of the driving environment from those substantially above the surface. The imaging system may adjust the vertical orientation of the entire sensor, the vertical field or regard, and/or the area of focus (e.g., changing the density of lidar scan lines in one or more vertical regions) in response to the determined VROI. The vertical orientation of the entire sensor may also be adjusted based on sensor data indicating a change in attitude of the vehicle and/or on a rate of change of attitude of the vehicle.

FIG. 1 illustrates an example architecture of an imaging system 100 that dynamically controls one or more parameters of one or more of sensors 102. The sensors 102 may be utilized by an autonomous vehicle (e.g., to make intelligent driving decisions based on the vehicle's current environment), or by a non-autonomous vehicle for other purposes (e.g., to collect data pertaining to a particular driving trip). As the term is used herein, an "autonomous" or "self-driving" vehicle is a vehicle configured to sense its environment and navigate or drive with no human input, with little human input, with optional human input, and/or with circumstance-specific human input. For example, an autonomous vehicle may be configured to drive to any suitable location and control or perform all safety-critical functions (e.g., driving, steering, braking, parking) for the entire trip, with the driver not being expected (or even able) to control the vehicle at any time. As another example, an autonomous vehicle may allow a driver to safely turn his or her attention away from driving tasks in particular environments (e.g., on freeways) and/or in particular driving modes.

An autonomous vehicle may be configured to drive with a human driver present in the vehicle, or be configured to drive with no human driver present. As an example, an autonomous vehicle may include a driver's seat with associated controls (e.g., steering wheel, accelerator pedal, and brake pedal), and the vehicle may be configured to drive with no one seated in the driver's seat or with limited, conditional, or no input from a person seated in the driver's seat. As another example, an autonomous vehicle may not include any driver's seat or associated driver's controls, with the vehicle performing substantially all driving functions (e.g., driving, steering, braking, parking, and navigating) at all times without human input (e.g., the vehicle may be configured to transport human passengers or cargo without a driver present in the vehicle). As another example, an autonomous vehicle may be configured to operate without any human passengers (e.g., the vehicle may be configured for transportation of cargo without having any human passengers onboard the vehicle).

As the term is used herein, a "vehicle" may refer to a mobile machine configured to transport people or cargo. For example, a vehicle may include, may take the form of, or may be referred to as a car, automobile, motor vehicle, truck, bus, van, trailer, off-road vehicle, farm vehicle, lawn mower, construction equipment, golf cart, motorhome, taxi, motorcycle, scooter, bicycle, skateboard, train, snowmobile, watercraft (e.g., a ship or boat), aircraft (e.g., a fixed-wing aircraft, helicopter, or dirigible), or spacecraft. In particular embodiments, a vehicle may include an internal combustion engine or an electric motor that provides propulsion for the vehicle. As shown in FIG. 1, the vehicle includes N different sensors 102, with N being any suitable integer (e.g., 1, 2, 3, 5, 10, 20, etc.). At least "Sensor 1" of the sensors 102 is configured to sense the environment of the autonomous vehicle by physically interacting with the environment in some way, such as transmitting and receiving lasers that reflect off of objects in the environment (e.g., sensor may be a lidar device), transmitting and receiving radio or acoustic signals that reflect off of objects in the environment (e.g., the sensor may be a radar or sonar device), simply receiving light waves generated or reflected from different areas of the environment (e.g., the sensor may be a camera), and so on. Depending on the embodiment, all of the sensors 102 may be configured to sense portions of the environment, or one or more of the sensors 102 may not physically interact with the external environment (e.g., if one of the sensors 102 is an inertial measurement unit (IMU)). The sensors 102 may all be of the same type, or they may include a number of different sensor types (e.g., multiple lidar devices with different viewing perspectives, and/or a combination of lidar, camera, radar, and thermal imaging devices, etc.). In addition to the sensors 102, there is included an attitude sensor 105. The attitude sensor 105 may be, for example, an angular velocity sensor arranged to sense one or more of vehicle pitch, roll and yaw. The attitude sensor may include one or more gyroscopes, which may be mechanical gyroscopes, optical gyroscopes such as ring laser gyroscopes and fiber optic gyroscopes or silicon gyroscopes, which may include micromechanical sensors (MEMS).

The data generated by the sensors 102 and attitude sensor 105 is input to a perception component 104 of the sensor control architecture 100, and the data is processed by the perception component 104 to generate perception signals 106 descriptive of a current state of the vehicle's environment. It is understood that the term "current" may actually refer to a very short time prior to the generation of any given perception signals 106, e.g., due to any processing delay introduced by the at least some portions of the perception component 104 and other factors. A separate VROI detection module 110 may generate perception signals associated with horizon estimations with a shorter processing delay than the more computationally intensive modules associated with object classification, for example. To generate additional perception signals 106, the perception component 104 may include a segmentation, classification, and tracking module 112. In some implementations, separate segmentation, classification, and tracking modules generate some of the perception signals 106.

The sensor control architecture 100 also includes a prediction component 120, which processes the perception signals 106 to generate prediction signals 122 descriptive of one or more predicted future states of the vehicle's environment. For a given object, for example, the prediction component 120 may analyze the type/class of the object along with the recent tracked movement of the object (as determined by the segmentation, classification, and tracking module 112) to predict one or more future positions of the object. As a relatively simple example, the prediction component 120 may assume that any moving objects will continue to travel with no change to their current direction and speed, possibly taking into account first- or higher-order derivatives to better track objects that have continuously changing directions, objects that are accelerating, and so on. Additionally or alternatively, the prediction component 120 may predict the perception signals associated with horizon estimations to augment and/or verify the signals generated by the VROI detection module 110 based on latest sensor data. The prediction component 120 may use past values generated by the VROI detection module 110 (e.g., using low pass, median, Kalman, or any other suitable filtering) and/or past values generated by the segmentation, classification, and tracking module 112 (e.g., using identified road configuration). The prediction component may also use current or past the attitude sensor 105 data directly in connection with making predictions of perception signals associated with horizon estimations.

The perception signals 106 and (in some embodiments) prediction signals 122 are input to a sensor control component 130, which processes the signals 106, 122 to generate sensor control signals 132 that control one or more parameters of at least one of the sensors 102 (including at least a parameter of "Sensor 1"). In particular, the sensor control component 130 attempts to direct the focus of one or more of the sensors 102 based on the detected and/or predicted VROI. The parameter adjustment module 136 determines the setting for parameter(s) of the controlled sensor(s) (among sensors 102) at least in part based on the detected VROI. In particular, the parameter adjustment module 136 determines values of one or more parameters that set the area of focus of the controlled sensor(s). Generally, the controlled parameter(s) is/are parameters that affect which area/portion of the vehicle environment is sensed by a particular sensor. For example, the parameter adjustment module 136 may determine values that set the horizontal and/or vertical field of regard of the controlled sensor(s) (e.g., the range of azimuthal and/or elevation angles covered by the field of regard), the center of the field of regard (e.g., by mechanically moving the entire sensor, or adjusting mirrors that move the center of the field of regard), and/or the spatial distribution of scan lines produced by the sensor(s). Example scan line distributions are discussed in more detail below, with reference to FIG. 4. In some embodiments, the controlled sensor parameter(s) affect not only the area of focus for a sensor, but also the manner in which a given area of the vehicle environment is sensed. For example, the parameter adjustment module 136 may control the frame/refresh rate of the sensor, the resolution (e.g., number of points per point cloud frame) of the sensor, and so on.

As seen from various examples provided above, sensor data collected by a vehicle may in some embodiments include point cloud data that is generated by one or more lidar devices or, more generally, a lidar system.

Figure 2:
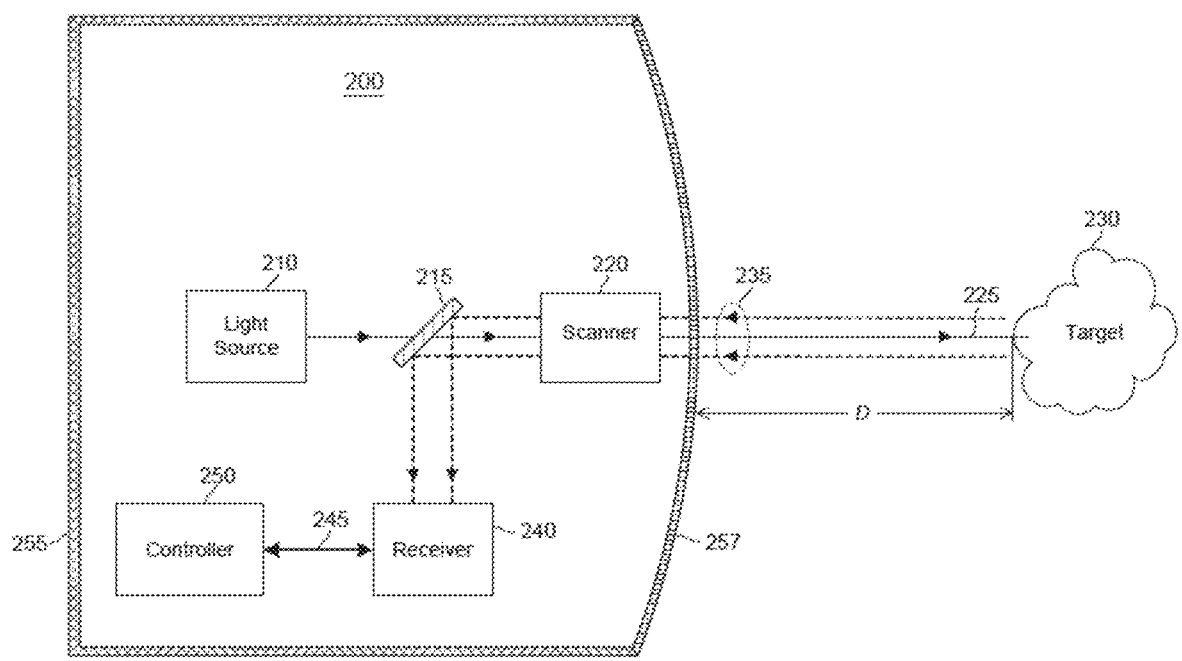
FIG. 2 is a block diagram of an example light detection and ranging (lidar) system.

Referring first to FIG. 2, a lidar system 200 can operate as at least one of the sensors 102 of FIG. 1, for example. While various lidar system components and characteristics are described herein, it is understood that any suitable lidar device(s) or system(s), and/or any other suitable types of sensors, may provide sensor data for processing using the software architectures described herein.

The example lidar system 200 may include a light source 210, a mirror 215, a scanner 220, a receiver 240, and a controller 250. The light source 210 may be, for example, a laser (e.g., a laser diode) that emits light having a particular operating wavelength in the infrared, visible, or ultraviolet portions of the electromagnetic spectrum. In operation, the light source 210 emits an output beam of light 225 which may be continuous-wave, pulsed, or modulated in any suitable manner for a given application. The output beam of light 225 is directed downrange toward a remote target 230 located a distance D from the lidar system 200 and at least partially contained within a field of regard of the system 200.

Once the output beam 225 reaches the downrange target 230, the target 230 may scatter or, in some cases, reflect at least a portion of light from the output beam 225, and some of the scattered or reflected light may return toward the lidar system 200. In the example of FIG. 2, the scattered or reflected light is represented by input beam 235, which passes through the scanner 220, which may be referred to as a beam scanner, optical scanner, or laser scanner. The input beam 235 passes through the scanner 220 to the mirror 215, which may be referred to as an overlap mirror, superposition mirror, or beam-combiner mirror. The mirror 215 in turn directs the input beam 235 to the receiver 240.

The input beam 235 may include light from the output beam 225 that is scattered by the target 230, light from the output beam 225 that is reflected by the target 230, or a combination of scattered and reflected light from target 230. According to some implementations, the lidar system 200 can include an "eye-safe" laser that presents little or no possibility of causing damage to the human eye. The input beam 235 may contain only a relatively small fraction of the light from the output beam 225.

The receiver 240 may receive or detect photons from the input beam 235 and generate one or more representative signals. For example, the receiver 240 may generate an output electrical signal 245 that is representative of the input beam 235. The receiver may send the electrical signal 245 to the controller 250. Depending on the implementation, the controller 250 may include one or more instruction-executing processors, an application-specific integrated circuit (ASIC), a field-programmable gate array (FPGA), and/or other suitable circuitry configured to analyze one or more characteristics of the electrical signal 245 in order to determine one or more characteristics of the target 230, such as its distance downrange from the lidar system 200. More particularly, the controller 250 may analyze the time of flight or phase modulation for the beam of light 225 transmitted by the light source 210. If the lidar system 200 measures a time of flight of T (e.g., T representing a round-trip time of flight for an emitted pulse of light to travel from the lidar system 200 to the target 230 and back to the lidar system 200), then the distance D from the target 230 to the lidar system 200 may be expressed as D=c T/2, where c is the speed of light (approximately $3.0 \times 10^8$ m/s).

The distance D from the lidar system 200 is less than or equal to a maximum range $R_{MAX}$ of the lidar system 200. The maximum range $R_{MAX}$ (which also may be referred to as a maximum distance) of a lidar system 200 may correspond to the maximum distance over which the lidar system 200 is configured to sense or identify targets that appear in a field of regard of the lidar system 200. The maximum range of lidar system 200 may be any suitable distance, such as 60 m, 200 m. 500 m, or 1 km, for example.

In some implementations, the light source 210, the scanner 220, and the receiver 240 may be packaged together within a single housing 255, which may be a box, case, or enclosure that holds or contains all or part of the lidar system 200. The housing 255 includes a window 257 through which the beams 225 and 235 pass. The controller 250 may reside within the same housing 255 as the components 210, 220, and 240, or the controller 250 may reside outside of the housing 255. In one embodiment, for example, the controller 250 may instead reside within, or partially within, the perception component 104 of the sensor control architecture 100 shown in FIG. 1. In some implementations, the housing 255 includes multiple lidar sensors, each including a respective scanner and a receiver. Depending on the particular implementation, each of the multiple sensors can include a separate light source or a common light source. The multiple sensors can be configured to cover non-overlapping adjacent fields of regard or partially overlapping fields of regard, for example, depending on the implementation.

With continued reference to FIG. 2, the output beam 225 and input beam 235 may be substantially coaxial. In other words, the output beam 225 and input beam 235 may at least partially overlap or share a common propagation axis, so that the input beam 235 and the output beam 225 travel along substantially the same optical path (albeit in opposite directions). As the lidar system 200 scans the output beam 225 across a field of regard, the input beam 235 may follow along with the output beam 225, so that the coaxial relationship between the two beams is maintained.

Generally speaking, the scanner 220 steers the output beam 225 in one or more directions downrange. To accomplish this, the scanner 220 may include one or more scanning mirrors and one or more actuators driving the mirrors to rotate, tilt, pivot, or move the mirrors in an angular manner about one or more axes, for example. While FIG. 2 depicts only a single mirror 215, the lidar system 200 may include any suitable number of flat or curved mirrors (e.g., concave, convex, or parabolic mirrors) to steer or focus the output beam 225 or the input beam 235. For example, the first mirror of the scanner may scan the output beam 225 along a first direction, and the second mirror may scan the output beam 225 along a second direction that is substantially orthogonal to the first direction.

A "field of regard" of the lidar system 200 may refer to an area, region, or angular range over which the lidar system 200 may be configured to scan or capture distance information. When the lidar system 200 scans the output beam 225 within a 30-degree scanning range, for example, the lidar system 200 may be referred to as having a 30-degree angular field of regard. The scanner 220 may be configured to scan the output beam 225 horizontally and vertically, and the field of regard of the lidar system 200 may have a particular angular width along the horizontal direction and another particular angular width along the vertical direction. For example, the lidar system 200 may have a horizontal field of regard of 10° to 120° and a vertical field of regard of 2° to 45°.

The one or more scanning mirrors of the scanner 220 may be communicatively coupled to the controller 250, which may control the scanning mirror(s) to guide the output beam 225 in a desired direction downrange or along a desired scan pattern. In general, a scan (or scan line) pattern may refer to a pattern or path along which the output beam 225 is directed. The lidar system 200 can use the scan pattern to generate a point cloud with points or "pixels" that substantially cover the field of regard. The pixels may be approximately evenly distributed across the field of regard, or they may be distributed according to a particular non-uniform distribution.

In operation, the light source 210 may emit pulses of light which the scanner 220 scans across a field of regard of the lidar system 200. The target 230 may scatter one or more of the emitted pulses, and the receiver 240 may detect at least a portion of the pulses of light scattered by the target 230. The receiver 240 may receive or detect at least a portion of the input beam 235 and produce an electrical signal that corresponds to the input beam 235. The controller 250 may be electrically coupled or otherwise communicatively coupled to one or more of the light source 210, the scanner 220, and the receiver 240. The controller 250 may provide instructions, a control signal, or a trigger signal to the light source 210 indicating when the light source 210 should produce optical pulses, and possibly characteristics (e.g., duration, period, peak power, wavelength, etc.) of the pulses. The controller 250 may also determine a time-of-flight value for an optical pulse based on timing information associated with when the pulse was emitted by light source 210 and when a portion of the pulse (e.g., the input beam 235) was detected or received by the receiver 240.

As indicated above, the lidar system 200 may be used to determine the distance to one or more downrange targets 230. By scanning the lidar system 200 across a field of regard, the system can be used to map the distance to a number of points within the field of regard. Each of these depth-mapped points may be referred to as a pixel or a voxel. A collection of pixels captured in succession (which may be referred to as a depth map, a point cloud, or a point cloud frame) may be rendered as an image or may be analyzed to identify or detect objects or to determine a shape or distance of objects within the field of regard. For example, a depth map may cover a field of regard that extends 60° horizontally and 15° vertically, and the depth map may include a frame of 100-2000 pixels in the horizontal direction by 4-400 pixels in the vertical direction.

The lidar system 200 may be configured to repeatedly capture or generate point clouds of a field of regard at any suitable frame rate between approximately 0.1 frames per second (FPS) and approximately 1,000 FPS, for example. The point cloud frame rate may be substantially fixed or dynamically adjustable, depending on the implementation. In general, the lidar system 200 can use a slower frame rate (e.g., 1 Hz) to capture one or more high-resolution point clouds, and use a faster frame rate (e.g., 10 Hz) to rapidly capture multiple lower-resolution point clouds.

The field of regard of the lidar system 200 can overlap, encompass, or enclose at least a portion of the target 230, which may include all or part of an object that is moving or stationary relative to lidar system 200. For example, the target 230 may include all or a portion of a person, vehicle, motorcycle, truck, train, bicycle, wheelchair, pedestrian, animal, road sign, traffic light, lane marking, road-surface marking, parking space, pylon, guard rail, traffic barrier, pothole, railroad crossing, obstacle in or near a road, curb, stopped vehicle on or beside a road, utility pole, house, building, trash can, mailbox, tree, any other suitable object, or any suitable combination of all or part of two or more objects.

Figure 3:
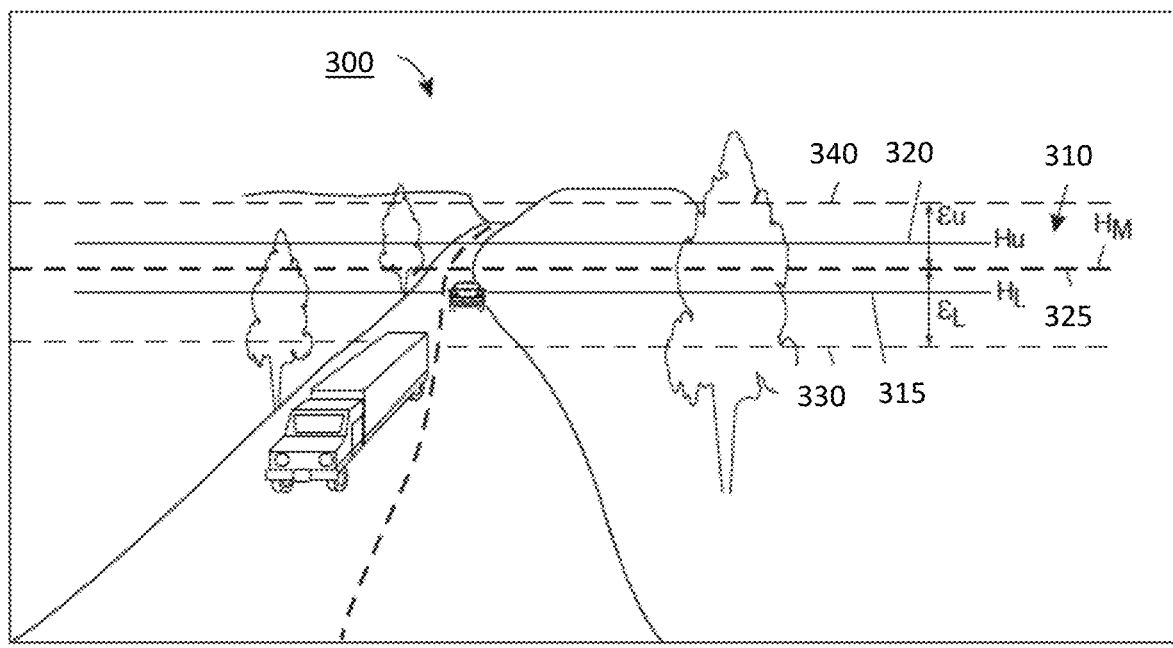
FIG. 3 illustrates an example VROI comprising a virtual horizon overlaid on an example environment within which the lidar system of FIG. 1 may operate.

FIG. 3 illustrates a scene 300 within which the VROI detection module 110 may identify a VROI 310. To that end, the VROI detection module 110 may generate a lower bound 315 and an upper bound 320 of the VROI 310. The scene 300 may correspond to a scene subtended by an FOR of a sensor, such as for example the FOR of lidar system 200 illustrated in FIG. 3. The scene 300 may also represent a combination of FORs of multiple sensor heads (e.g., the sensor heads 308A and 308B of FIG. 4A. The scene 300 depicts the observed driver environment for the purpose of illustrating a possible context for detecting a VROI based on the lower estimate 316 and the upper estimate 320 of horizon elevation. In some implementations, a visual indication of the lower estimate 315 and the upper estimate 320 of horizon elevation need not be generated to adjust sensor parameters. In other implementations, lines or other visual indications of at least one of the lower estimate 315 and the upper estimate 320 of the horizon may be overlaid on a display of a point cloud (i.e., source data for the horizon estimates) generated by a sensor or on a video display of a camera view suitably aligned with the FOR of the sensor.

Figure 4:
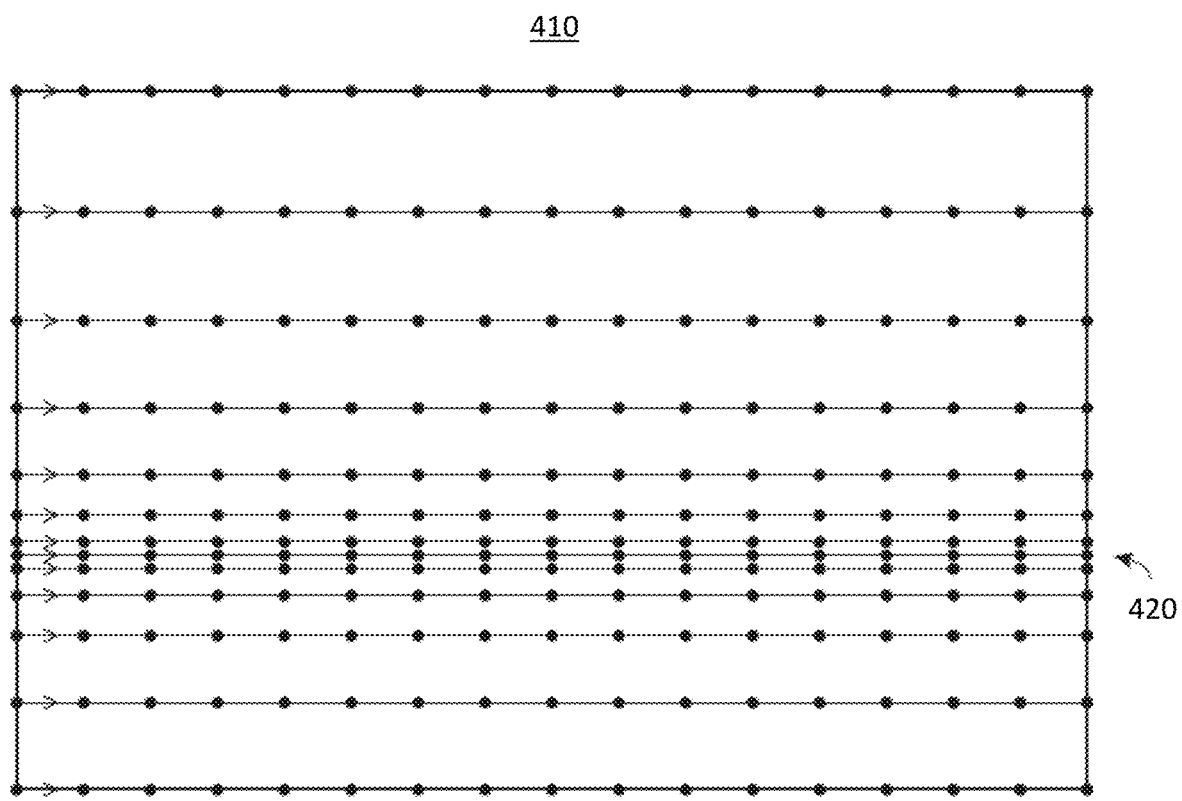
FIG. 4 illustrates an example scan pattern with scan line distribution adjusted based on the VROI.

The VROI detection module 110 may combine the lower estimate 315 and the upper estimate 320 of horizon elevation to generate a middle estimate 325 of horizon elevation angle or, more concisely, an estimated horizon angle. In some implementations, the VROI detection module 110 may compute the estimated horizon 325 as the average of the lower estimate 315 and the upper estimate 320 of horizon elevations. In other implementations, a weighted average of the lower estimate 315 and the upper estimate 320 of horizon elevations yields the estimated horizon 325, depending on the corresponding confidence measures for the lower 315 and upper 320 estimates, as discussed below. Furthermore, the VROI detection module 110 may compute a measure of confidence for the estimated horizon 325, based, for example, on the difference between the lower estimate 315 and the upper estimate 320 of horizon elevations. For example, a difference of less than 1°, 2° or any suitable angular range may indicate a high confidence in the estimated horizon 325, while the difference of more than 2°, 3°, 4° or any suitable angular range may indicate a low confidence in the estimated horizon 325. If the measure of confidence (which may be referred to as a metric of uncertainty) exceeds a particular threshold angular value (e.g., 3°), then the scan pattern may be set to a default scan pattern. A default scan pattern may be a scan pattern that includes a particular distribution of scan lines (e.g., as illustrated in FIG. 4). One or more default scan patterns may be stored within a lidar system (e.g., the lidar system 200), and the lidar system may switch to one of the default scan patterns when there is a low confidence in the estimated horizon 425.

The VROI detection module 110 may determine an extended lower boundary 330 of the VROI 310 based on the estimated horizon 325 by subtracting a lower angular margin, $\varepsilon_L$, from the estimated horizon 325. Analogously, the VROI detection module 110 may determine an extended upper boundary 340 of the VROI 410 based on the estimated horizon 325 by adding an upper angular margin, $\varepsilon_L$, to the estimated horizon 325. In some implementations, the lower and upper angular margins may be equal. Furthermore, the lower and upper angular margins may be calculated in view of the measure of confidence for the estimated horizon 325. In some implementations, the margin $\varepsilon=\varepsilon_L=\varepsilon_U$, may be set to the angular difference between the lower estimate 315 and the upper estimate 320 of horizon elevations. Generally, the VROI detection module 110 may set the extent of the VROI 410 (e.g., the difference between the extended upper boundary 340 and the extended lower boundary 330), to a larger value when the confidence in the estimated horizon 325 is low and to a smaller value when the confidence in the estimated horizon 325 is high.

The extended lower boundary 330 and extended upper boundary 340 of the VROI 310 may be included in the perception signals 106 sent by the perception component 104 to the sensor control component 130 of FIG. 1. The parameter adjustment module 136 of the sensor control component 130 may then adjust the parameters of the sensors 102. For example, the sensor control component 130 may adjust the FOR of a lidar (e.g., the lidar system 200). Additionally or alternatively, the parameter adjustment module 136 may adjust a scan pattern (e.g., the scan pattern 260) of the lidar.

FIG. 4 illustrates a scan pattern 410 adjusted by the parameter adjustment module 136 in response to the VROI parameters generated by the VROI detection module 110 and included in the perception signals 106. Scan line 420 may represent the scan line at the elevation angle of the estimated horizon 325, with the line density gradually decreasing with the elevation angle deviation from the estimated horizon 325. The width of the peak in the angular distribution of scan lines may be based on the confidence in the estimated horizon 325, with the scan line distribution widening when the confidence decreases.

The parameter adjustment module 136 may configure other density distributions of scan lines based on parameters generated by the VROI detection module 110. The distributions may include one or more regions of uniform scan line densities and/or regions of variable scan line densities.

The above discussion of the VROI underscores the importance of an accurate estimation of the virtual horizon 325, including the upper 320 and lower limits 315 of the horizon estimation throughout the travel route traversed by the vehicle.

Figure 5:
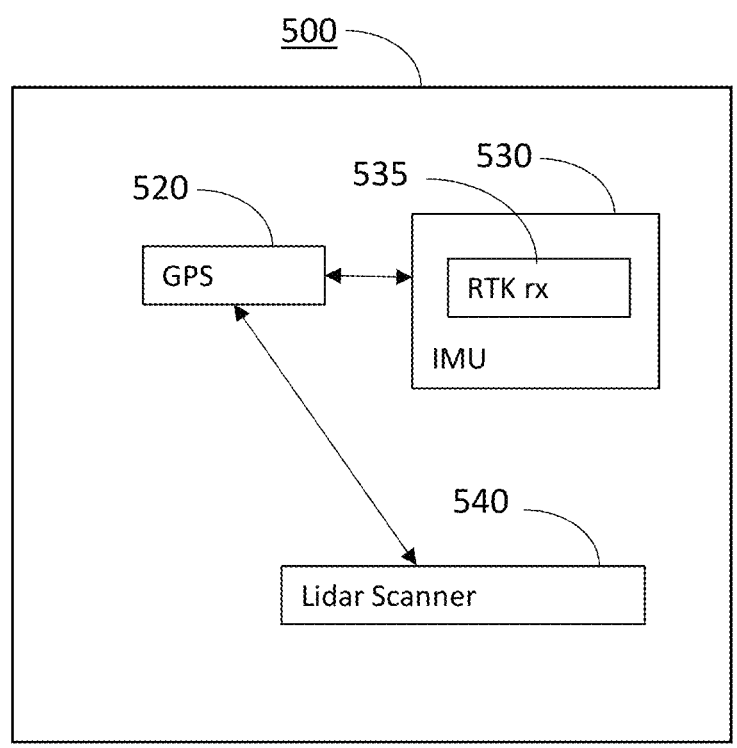
FIG. 5 is a block diagram of an example vehicle-mounted system for assessing accuracy of a lidar-based horizon estimation with a GPS/IMU.

FIG. 5 shows an example system for determining the accuracy of the lidar system and the effectiveness of algorithms used by the lidar system to estimate the horizon. The system 500 in FIG. 5, which is mounted on a vehicle, includes a GPS antenna 520, an Inertial Measurement Unit (IMU) 630 including a GPS receiver and a receiver 535 for Real Time Kinematic (RTK) correction data, and a lidar 540. The IMU may also include one or more accelerometers, gyroscopes, or magnetometers to further enhance the accuracy of the position and attitude determinations of the system.

Because the GPS location data is specific to the location of the antenna, the relative location of the GPS antenna 520 with respect to the optics of the lidar system, as well as the relative location of the GPS antenna and lidar scanner 540 with respect to the road surface must be known. External to the system is the array of GPS satellites and a fixed, land-based RTK base station. The operation details of the GPS system and the RTK enhancements to the accuracy of the GPS system are outside the scope of this disclosure, but it is sufficient to state that RTK GPS has position accuracy at the centimeter level.

Figure 6:
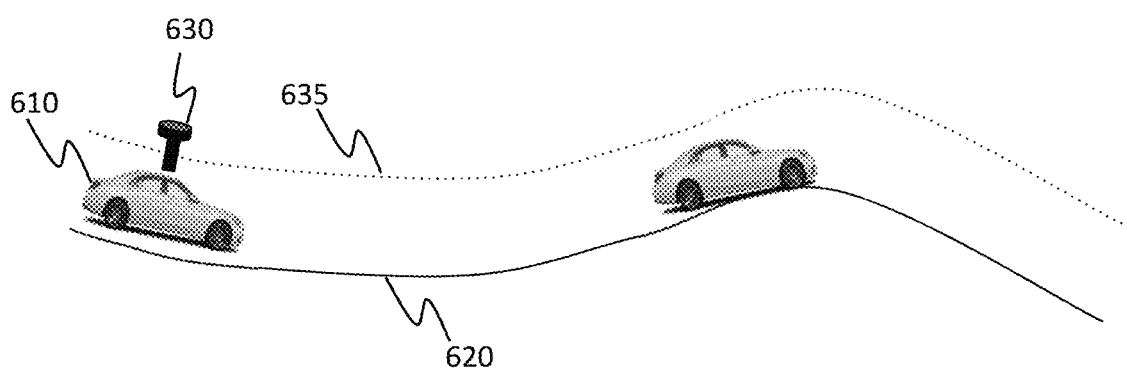
FIG. 6 is a diagram of a vehicle-mounted GPS/IMU obtaining topography data.

As illustrated in FIG. 6, as the vehicle 610 travels a route having a road surface 620, the GPS/IMU records highly accurate position data 635 relative to the GPS antenna 630 position on the vehicle at locations along the route. The timing of the recording of each location can be at fixed time intervals, for example, based on time of day clock signals received by the GPS, or the timing can be coordinated with the lidar system to coincide with the times at which lidar frames are taken. The frequency of GPS/IMU position recordings may also be higher than that of the lidar frame acquisition rate. For example, two, three, four or more GPS/IMU positions may be recorded for every lidar frame.

Figure 7:
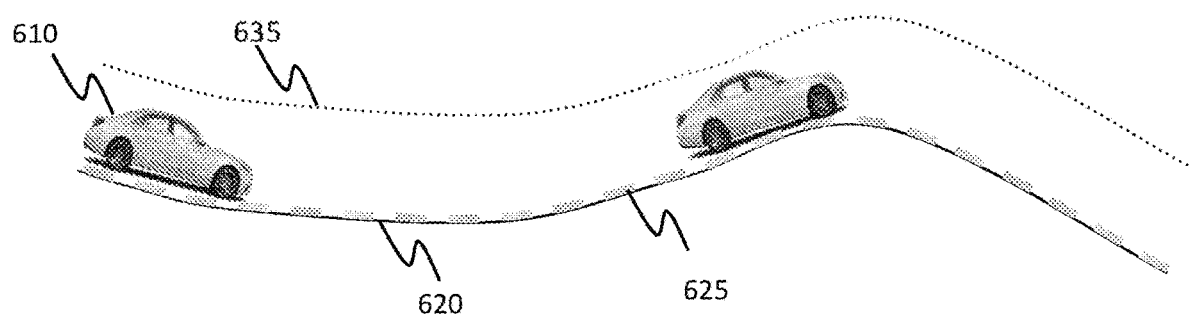
FIG. 7 is a diagram of calculating road topography based on the vehicle-mounted GPS/IMU obtained topography data.

As illustrated in FIG. 7, the topography of the road surface 620 (indicated by grey bars 625) of the driven route in absolute coordinates (e.g. Universal Transverse Mercator (UTM)) is calculated. This is done by combining the recorded. GPS/IMU data relative to the GPS antenna 630 location on the vehicle 610 and calibration data for the location of the GPS antenna on the vehicle, and the vehicle dimensions, so that the difference in position between the antenna and the road surface can be calculated.

Figure 8:
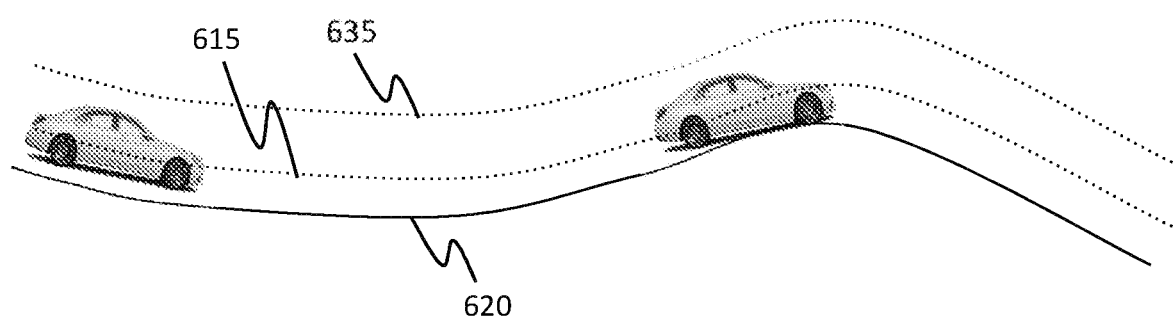
FIG. 8 is a diagram of calculating lidar trajectory based on GPS/IMU derived road topography.

As illustrated in FIG. 8, the trajectory 616 of the lidar of the driven route is calculated. This includes the position and orientation of the lidar at the points in time at which the GPS/IMU-derived locations are obtained and are recorded in absolute coordinates (e.g. UTM). This is done using the known physical relationship between the GPS/IMU system and the lidar. The orientation of the lidar is necessary to record at each position because any pitch of the vehicle off horizontal will aim the lidar off the horizontal (sometimes referred to as the neutral angle) as well. Orientation of the vehicle may be determined in part by vehicle-mounted gyroscope data.

Figure 9:
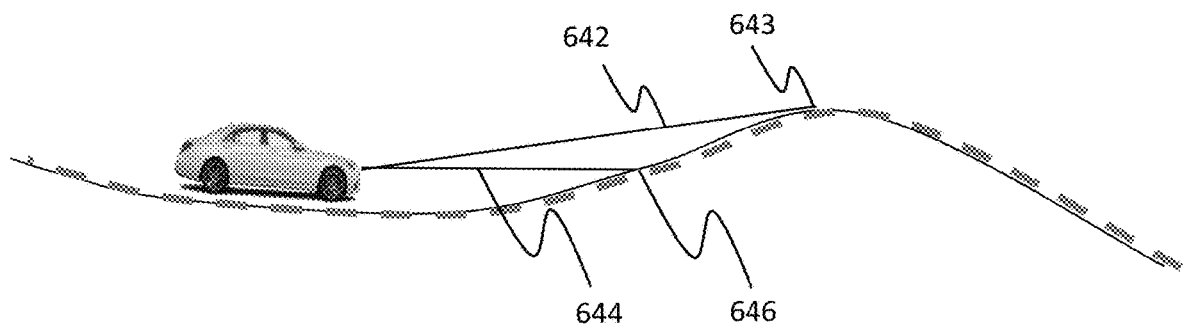
FIG. 9 is a diagram of a vertical angle of the horizon relative to a vehicle at two distances from the vehicle.

As illustrated in FIG. 9, using the trajectory and orientation of the lidar as well as the road topography ahead of the vehicle, the vertical angles of the upper 642 and lower 644 limits of the horizon in the lidar field of view are calculated. In this example, the upper limit of the virtual horizon 643 is at 120 meters from the vehicle and the lower limit 646 is at 60 meters from the vehicle. The 60-120 meter values for lower and upper horizon limits are examples, and the horizon values are not necessarily fixed, even for one trip. The min/max values for the horizon are design parameters that can have any suitable value (e.g., between 10 and 250 meters) and can be selected based on the application. For example, for a vehicle moving slowly in traffic, horizon lower and upper limits of 10-30 meters may be selected, as the field of regard close to the vehicle is most critical at slow speeds. For a vehicle moving more rapidly on a highway, the horizon lower and upper limits may be set to values between 100-250 meters, because at higher speeds, objects at a longer distance may represent hazards that will be reached in short periods of time.

The GPS/IMU-determined vertical angles for the upper and lower limits of the virtual horizon are then compared with the upper and lower limit vertical angles as determined by the lidar system for every lidar frame along the route.

As noted above, the GPS/IMU position data may be recorded more frequently than the lidar frame acquisition rate. The higher acquisition rate for recording GPS/IMU position enables a more detailed topography of the travelled route, which can improve the accuracy of the horizon calculations against which the lidar horizon estimates are compared.

Figure 10:
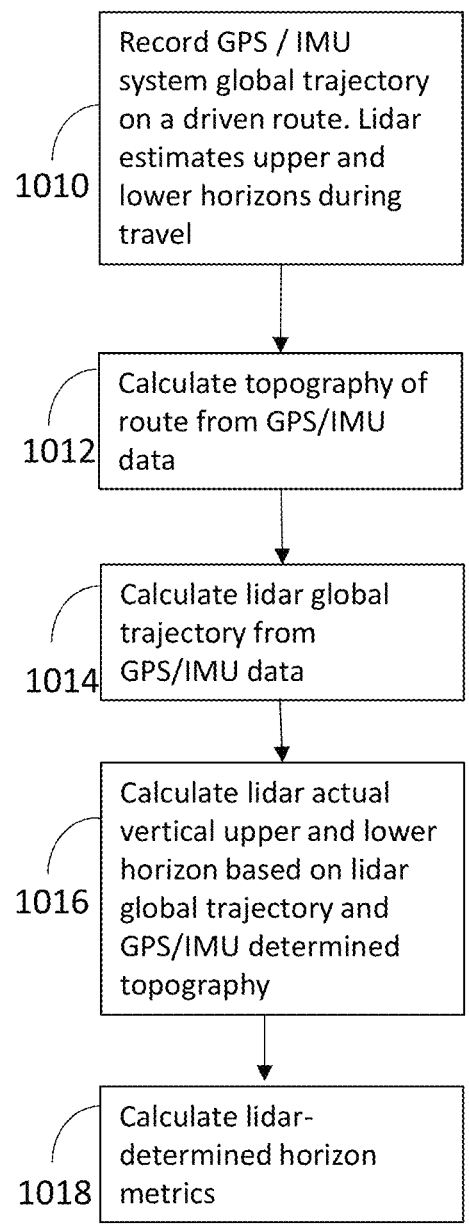
FIG. 10 is an example flow diagram for assessing a lidar-based horizon estimation based on a route topography generated with a vehicle-based GPS/IMU.

FIG. 10 is an example flow diagram for calculating accuracy metrics for lidar-based horizon estimations based on using a GPS/IMU to create reference topography and reference horizon estimations for a vehicle travelling a route.

At step 1010, global position data and vehicle orientation are recorded at points along the travelled route, as described above with respect to FIG. 6, and based on GPS/IMU equipment mounted on the vehicle. Concurrent with this step, a vehicle-mounted lidar system determines upper and lower limit virtual horizon estimations in near-real time. The recorded position points may be recorded in UTM coordinates or may recorded as positions relative to origin of travel At step 1012, the topography of the travelled route is calculated from the GPS/IMU data recorded in step 1010. This topography may be of the road surface, based on the known position of the GPS antenna on the vehicle, or may be a topography relative to the altitude of the GPS antenna at this stage.

At step 1014, the trajectory of the lidar system is calculated based on the GPS/IMU data. Calculation of the trajectory of the lidar system requires adjusting the GPS/IMU data for the difference in position on the vehicle of the GPS/IMU antenna and the lidar system optics and also the vehicle orientation. For example, the relative altitude between a lidar system mounted on the front of a vehicle and a roof mounted GPS antenna will change if the vehicle is on an incline. The lidar trajectory may be calculated for each location where a lidar frame is acquired or may be calculated at shorter intervals if the GPS data is acquired at a higher rate than the lidar frame rate.

At step 1016, the reference upper and lower limit vertical horizon angles are calculated relative to the lidar system, based on the GPS/IMU determined topography of the travelled route (step 1012) and on the GPS/IMU determined trajectory of the lidar system (step 1014).

At step 1018, the lidar system estimates for upper and lower limit vertical horizon angle are compared to the reference angles determined at step 1016 to produce lidar system accuracy data for the travelled route. Because the GPS/IMU-derived topographical reference data is only available for locations where the vehicle has travelled, there will not be reference data with which to compare the lidar horizon estimates for the last portion of the route. The length of the portion of the route for which there will not be GPS/IMU data will be roughly the upper horizon distance limit. Stated otherwise, the last vehicle location for which there will be GPS/IMU reference data with which to establish an upper limit reference horizon for the lidar will be at a distance short of the end of the travelled route that is equal to the upper horizon distance limit.

The distance between locations at which GPS/IMU position data are acquired and the locations at which lidar frames are acquired will depend on vehicle speed, assuming that the GPS/IMU data and the lidar frames are acquired at a fixed repetition rate. It is also possible to obtain the GPS/IMU data and the lidar frames at fixed distance intervals about the travel route. This may be done using additional inputs such as vehicle wheel rotation, the GPS/IMU system itself or by having the vehicle travel at an accurate fixed speed. It may also be desirable to vary the distance between GPS/IMU recordings of position based on the topography. For example, a vertically undulating route may require that more GPS/IMU position points are acquired in portions of the route where altitude is changing rapidly than in more gently sloping or flat portions of the route.

Analysis of lidar-determined horizon estimation is necessarily a post-real-time process given that the vehicle will not have arrived at the locations forward of the vehicle at the time that the lidar is estimating horizon based on topography well ahead of the vehicle. At best, a GPS/IMU system as described herein can produce lidar accuracy comparisons that lag vehicle position by no less than the upper horizon distance plus processing time.

Figure 11:
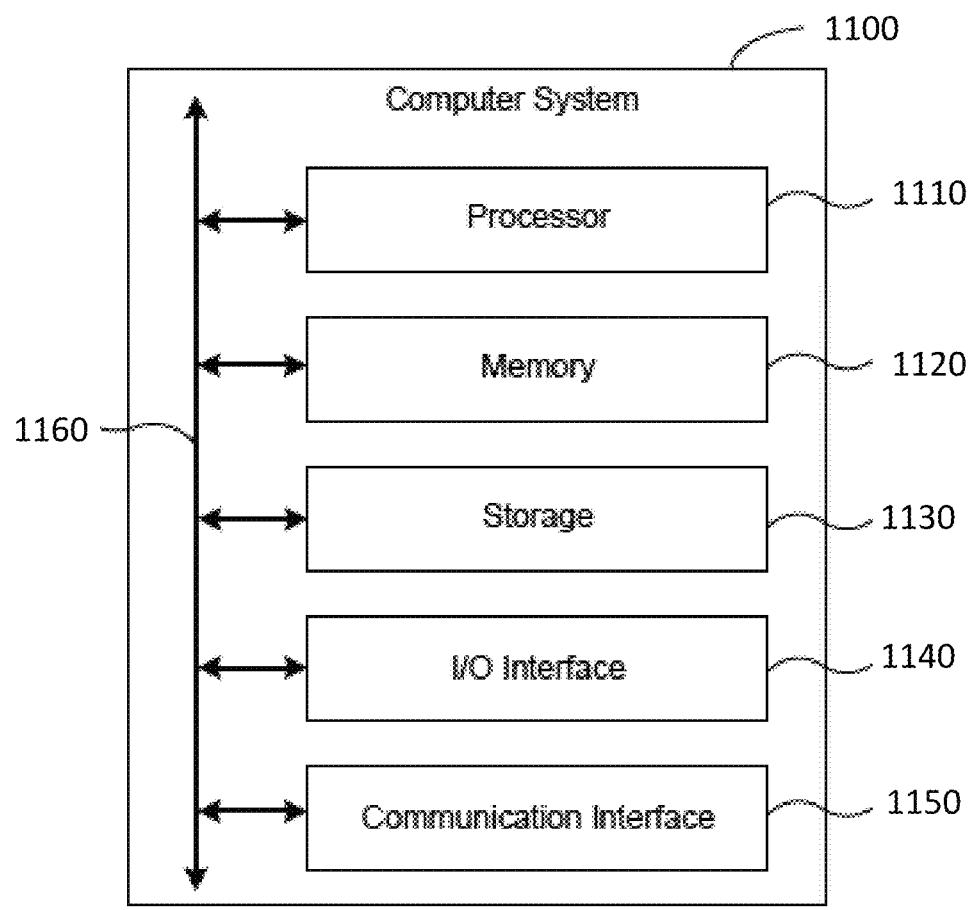
FIG. 11 illustrates an example computer system.

FIG. 11 illustrates an example computer system 1100. In particular embodiments, one or more computer systems 1100 may perform one or more steps of one or more methods described or illustrated herein. In particular embodiments, one or more computer systems 1100 may provide functionality described or illustrated herein. In particular embodiments, software running on one or more computer systems 1100 may perform one or more steps of one or more methods described or illustrated herein or may provide functionality described or illustrated herein. Particular embodiments may include one or more portions of one or more computer systems 1100. In particular embodiments, a computer system may be referred to as a processor, a controller, a computing device, a computing system, a computer, a general-purpose computer, or a data-processing apparatus. Herein, reference to a computer system may encompass one or more computer systems, where appropriate.

Computer system 1100 may take any suitable physical form. As an example, computer system 1100 may be an embedded computer system, a system-on-chip (SOC), a single-board computer system (SBC), a desktop computer system, a laptop or notebook computer system, a mainframe, a mesh of computer systems, a server, a tablet computer system, or any suitable combination of two or more of these. As another example, all or part of computer system 1100 may be combined with, coupled to, or integrated into a variety of devices, including, but not limited to, a camera, camcorder, personal digital assistant (PDA), mobile telephone, smartphone, electronic reading device (e.g., an e-reader), game console, smart watch, clock, calculator, television monitor, flat-panel display, computer monitor, vehicle display (e.g., odometer display or dashboard display), vehicle navigation system, lidar system, ADAS, autonomous vehicle, autonomous-vehicle driving system, cockpit control, camera view display (e.g., display of a rear-view camera in a vehicle), eyewear, or head-mounted display. Where appropriate, computer system 1100 may include one or more computer systems 1100; be unitary or distributed; span multiple locations; span multiple machines; span multiple data centers; or reside in a cloud, which may include one or more cloud components in one or more networks. Where appropriate, one or more computer systems 1100 may perform without substantial spatial or temporal limitation one or more steps of one or more methods described or illustrated herein. As an example, one or more computer systems 1100 may perform in real time or in batch mode one or more steps of one or more methods described or illustrated herein. One or more computer systems 1100 may perform at different times or at different locations one or more steps of one or more methods described or illustrated herein, where appropriate.

As illustrated in the example of FIG. 11, computer system 1100 may include a processor 1110, memory 1120, storage 1130, an input/output (I/O) interface 1140, a communication interface 1150, or a bus 1160. Computer system 1100 may include any suitable number of any suitable components in any suitable arrangement.

In particular embodiments, processor 1110 may include hardware for executing instructions, such as those making up a computer program. As an example, to execute instructions, processor 1110 may retrieve (or fetch) the instructions from an internal register, an internal cache, memory 1120, or storage 1130; decode and execute them; and then write one or more results to an internal register, an internal cache, memory 1120, or storage 1130. In particular embodiments, processor 1110 may include one or more internal caches for data, instructions, or addresses. Processor 1110 may include any suitable number of any suitable internal caches, where appropriate. As an example, processor 1110 may include one or more instruction caches, one or more data caches, or one or more translation lookaside buffers (TLBs). Instructions in the instruction caches may be copies of instructions in memory 1120 or storage 1130, and the instruction caches may speed up retrieval of those instructions by processor 1110. Data in the data caches may be copies of data in memory 1120 or storage 1130 for instructions executing at processor 1110 to operate on; the results of previous instructions executed at processor 1110 for access by subsequent instructions executing at processor 1110 or for writing to memory 1120 or storage 1130; or other suitable data. The data caches may speed up read or write operations by processor 1110. The TLBs may speed up virtual-address translation for processor 1110. In particular embodiments, processor 1110 may include one or more internal registers for data, instructions, or addresses. Processor 1110 may include any suitable number of any suitable internal registers, where appropriate. Where appropriate, processor 1110 may include one or more arithmetic logic units (ALUs); may be a multi-core processor; or may include one or more processors 1110.

In particular embodiments, memory 1120 may include main memory for storing instructions for processor 1110 to execute or data for processor 1110 to operate on. As an example, computer system 1100 may load instructions from storage 1130 or another source (such as, for example, another computer system 1100) to memory 1120. Processor 1110 may then load the instructions from memory 1120 to an internal register or internal cache. To execute the instructions, processor 1110 may retrieve the instructions from the internal register or internal cache and decode them. During or after execution of the instructions, processor 1110 may write one or more results (which may be intermediate or final results) to the internal register or internal cache. Processor 1110 may then write one or more of those results to memory 1120. One or more memory buses (which may each include an address bus and a data bus) may couple processor 1110 to memory 1120. Bus 1160 may include one or more memory buses. In particular embodiments, one or more memory management units (MMUs) may reside between processor 1110 and memory 1120 and facilitate accesses to memory 1120 requested by processor 1110. In particular embodiments, memory 1120 may include random access memory (RAM). This RAM may be volatile memory, where appropriate. Where appropriate, this RAM may be dynamic RAM (DRAM) or static RAM (SRAM). Memory 1120 may include one or more memories 1120, where appropriate.

In particular embodiments, storage 1130 may include mass storage for data or instructions. As an example, storage 1130 may include a hard disk drive (HDD), a floppy disk drive, flash memory, an optical disc, a magneto-optical disc, magnetic tape, or a Universal Serial Bus (USB) drive or a combination of two or more of these. Storage 1130 may include removable or non-removable (or fixed) media, where appropriate. Storage 1130 may be internal or external to computer system 1100, where appropriate. In particular embodiments, storage 1130 may be non-volatile, solid-state memory. In particular embodiments, storage 1130 may include read-only memory (ROM). Where appropriate, this ROM may be mask ROM (MROM), programmable ROM (PROM), erasable PROM (EPROM), electrically erasable PROM (EEPROM), flash memory, or a combination of two or more of these. Storage 1130 may include one or more storage control units facilitating communication between processor 1110 and storage 1130, where appropriate. Where appropriate, storage 1130 may include one or more storages 1130.

In particular embodiments, I/O interface 1140 may include hardware, software, or both, providing one or more interfaces for communication between computer system 1100 and one or more I/O devices. Computer system 1100 may include one or more of these I/O devices, where appropriate. One or more of these I/O devices may enable communication between a person and computer system 1100. As an example, an I/O device may include a keyboard, keypad, microphone, monitor, mouse, printer, scanner, speaker, camera, stylus, tablet, touch screen, trackball, another suitable I/O device, or any suitable combination of two or more of these. An I/O device may include one or more sensors. Where appropriate, I/O interface 1140 may include one or more device or software drivers enabling processor 1110 to drive one or more of these I/O devices. I/O interface 1140 may include one or more I/O interfaces 1140, where appropriate.

In particular embodiments, communication interface 1150 may include hardware, software, or both providing one or more interfaces for communication (such as, for example, packet-based communication) between computer system 1100 and one or more other computer systems 1100 or one or more networks. As an example, communication interface 1150 may include a network interface controller (NIC) or network adapter for communicating with an Ethernet or other wire-based network or a wireless NIC (WNIC); a wireless adapter for communicating with a wireless network, such as a WI-FI network; or an optical transmitter (e.g., a laser or a light-emitting diode) or an optical receiver (e.g., a photodetector) for communicating using fiber-optic communication or free-space optical communication. Computer system 1100 may communicate with an ad hoc network, a personal area network (PAN), an in-vehicle network (IVN), a local area network (LAN), a wide area network (WAN), a metropolitan area network (MAN), or one or more portions of the Internet or a combination of two or more of these. One or more portions of one or more of these networks may be wired or wireless. As an example, computer system 1100 may communicate with a wireless PAN (WPAN) (such as, for example, a BLUETOOTH WPAN), a WI-FI network, a Worldwide Interoperability for Microwave Access (WiMAX) network, a cellular telephone network (such as, for example, a Global System for Mobile Communications (GSM) network), or other suitable wireless network or a combination of two or more of these. As another example, computer system 1100 may communicate using fiber-optic communication based on 100 Gigabit Ethernet (100 GbE), 10 Gigabit Ethernet (10 GbE), or Synchronous Optical Networking (SONET). Computer system 1100 may include any suitable communication interface 1150 for any of these networks, where appropriate. Communication interface 1150 may include one or more communication interfaces 1150, where appropriate.

In particular embodiments, bus 1160 may include hardware, software, or both coupling components of computer system 1100 to each other. As an example, bus 1160 may include an Accelerated Graphics Port (AGP) or other graphics bus, a controller area network (CAN) bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local bus (VLB), or another suitable bus or a combination of two or more of these. Bus 1160 may include one or more buses 1160, where appropriate.

In particular embodiments, various modules, circuits, systems, methods, or algorithm steps described in connection with the implementations disclosed herein may be implemented as electronic hardware, computer software, or any suitable combination of hardware and software. In particular embodiments, computer software (which may be referred to as software, computer-executable code, computer code, a computer program, computer instructions, or instructions) may be used to perform various functions described or illustrated herein, and computer software may be configured to be executed by or to control the operation of computer system 1100. As an example, computer software may include instructions configured to be executed by processor 1110. In particular embodiments, owing to the interchangeability of hardware and software, the various illustrative logical blocks, modules, circuits, or algorithm steps have been described generally in terms of functionality. Whether such functionality is implemented in hardware, software, or a combination of hardware and software may depend upon the particular application or design constraints imposed on the overall system.

In particular embodiments, a computing device may be used to implement various modules, circuits, systems, methods, or algorithm steps disclosed herein. As an example, all or part of a module, circuit, system, method, or algorithm disclosed herein may be implemented or performed by a general-purpose single- or multi-chip processor, a digital signal processor (DSP), an ASIC, a FPGA, any other suitable programmable-logic device, discrete gate or transistor logic, discrete hardware components, or any suitable combination thereof. A general-purpose processor may be a microprocessor, or, any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In particular embodiments, one or more implementations of the subject matter described herein may be implemented as one or more computer programs (e.g., one or more modules of computer-program instructions encoded or stored on a computer-readable non-transitory storage medium). As an example, the steps of a method or algorithm disclosed herein may be implemented in a processor-executable software module which may reside on a computer-readable non-transitory storage medium. In particular embodiments, a computer-readable non-transitory storage medium may include any suitable storage medium that may be used to store or transfer computer software and that may be accessed by a computer system. Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs (e.g., compact discs (CDs), CD-ROM, digital versatile discs (DVDs), blu-ray discs, or laser discs), optical disc drives (ODDs), magneto-optical discs, magneto-optical drives, floppy diskettes, floppy disk drives (FDDs), magnetic tapes, flash memories, solid-state drives (SSDs), RAM, RAM-drives, ROM, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

In some cases, certain features described herein in the context of separate implementations may also be combined and implemented in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

While operations may be depicted in the drawings as occurring in a particular order, this should not be understood as requiring that such operations be performed in the particular order shown or in sequential order, or that all operations be performed. Further, the drawings may schematically depict one more example processes or methods in the form of a flow diagram or a sequence diagram. However, other operations that are not depicted may be incorporated in the example processes or methods that are schematically illustrated. For example, one or more additional operations may be performed before, after, simultaneously with, or between any of the illustrated operations. Moreover, one or more operations depicted in a diagram may be repeated, where appropriate. Additionally, operations depicted in a diagram may be performed in any suitable order. Furthermore, although particular components, devices, or systems are described herein as carrying out particular operations, any suitable combination of any suitable components, devices, or systems may be used to carry out any suitable operation or combination of operations. In certain circumstances, multitasking or parallel processing operations may be performed. Moreover, the separation of various system components in the implementations described herein should not be understood as requiring such separation in all implementations, and it should be understood that the described program components and systems may be integrated together in a single software product or packaged into multiple software products.

Various implementations have been described in connection with the accompanying drawings. However, it should be understood that the figures may not necessarily be drawn to scale. As an example, distances or angles depicted in the figures are illustrative and may not necessarily bear an exact relationship to actual dimensions or layout of the devices illustrated.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes or illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend.

The term "or" as used herein is to be interpreted as an inclusive or meaning any one or any combination, unless expressly indicated otherwise or indicated otherwise by context. Therefore, herein, the expression "A or B" means "A, B, or both A and B." As another example, herein, "A, B or C" means at least one of the following: A; B; C; A and B; A and C; B and C; A, B and C. An exception to this definition will occur if a combination of elements, devices, steps, or operations is in some way inherently mutually exclusive.

As used herein, words of approximation such as, without limitation, "approximately, "substantially," or "about" refer to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as having the required characteristics or capabilities of the unmodified feature. In general, but subject to the preceding discussion, a numerical value herein that is modified by a word of approximation such as "approximately" may vary from the stated value by +0.5%, +1%, +2%, +3%, +4%, +5%, +10%, +12%, or +15%.

As used herein, the terms "first," "second," "third," etc. may be used as labels for nouns that they precede, and these terms may not necessarily imply a particular ordering (e.g., a particular spatial, temporal, or logical ordering). As an example, a system may be described as determining a "first result" and a "second result," and the terms "first" and "second" may not necessarily imply that the first result is determined before the second result.

As used herein, the terms "based on" and "based at least in part on" may be used to describe or present one or more factors that affect a determination, and these terms may not exclude additional factors that may affect a determination. A determination may be based solely on those factors which are presented or may be based at least in part on those factors. The phrase "determine A based on B" indicates that B is a factor that affects the determination of A. In some instances, other factors may also contribute to the determination of A. In other instances, A may be determined based solely on B.

The invention claimed is:

1. A method of determining accuracy of a horizon determination made by a vehicle-mounted lidar system comprising:

recording, with a vehicle-mounted global positioning system-assisted inertial measurement unit (GPS/IMU) system, vehicle position and vehicle orientation data at particular points in time as the vehicle traverses a route;
generating a route topology based on the vehicle position and the vehicle orientation data;
recording a first horizon estimation by the lidar system corresponding to a first horizon angle relative to a neutral angle for at least one of the particular points in time;
determining a relative lidar system position and a relative lidar system orientation based on a relative location of the lidar system with respect to the GPS/IMU system;
calculating a second horizon estimation for the lidar system corresponding to a second horizon angle relative to a neutral angle for the at least one of the particular points in time based on the route topology and the relative lidar system position and relative lidar system orientation; and
assessing a horizon estimation accuracy of the lidar system that is able to generate the first horizon estimation faster than utilizing the GPS/IMU system to augment the calculation of the second horizon estimation including by comparing for the at least one of the particular points in time the first horizon estimation including the first horizon angle with the second horizon estimation including the second horizon angle to generate a horizon accuracy metric.

2. The method of claim 1, wherein: each of the particular points in time is associated with a particular frame of data captured by the lidar system.

3. The method of claim 1, wherein the route topology is based on the location of the lidar system on the vehicle.

4. The method of claim 1, wherein the route topology is a road surface route topology and the generation of the road surface route topology is further based on a location of the GPS/IMU system on the vehicle relative to the road surface.

5. The method of claim 1, wherein the GPS/IMU system vehicle position and vehicle orientation data is further based on real time kinematic (RTK) system correction data.

6. The method of claim 1, wherein the GPS/IMU system and the lidar system share a common time signal.

7. The method of claim 1, wherein each first horizon estimation comprises a first vertical angle corresponding to a first distance on a road surface ahead of the vehicle and each second horizon estimation comprises a second vertical angle corresponding to a second distance on the road surface ahead of the vehicle.

8. The method of claim 7 wherein the first and second distances on the road surface are located between 60 and 120 meters ahead of the vehicle.

9. The method of claim 7 wherein the first and second distances on the road surface are related to at least one of road speed limits, and road traffic levels.

10. The method of claim 1, wherein the particular points in time occur at fixed time intervals.

11. The method of claim 1, wherein the particular points in time occur at fixed distance intervals travelled by the vehicle.

12. The method of claim 1, wherein the particular points in time correspond to distance traveled by the vehicle and to the route topology.

13. The method of claim 12, wherein the particular points in time occur at shorter distance intervals for irregular road surface topology than distance intervals for flat road surface topology.

14. The method of claim 1, wherein the vehicle orientation data is based in part on vehicle-mounted gyroscope data.

15. A method of determining accuracy of a horizon determination made by a vehicle-mounted lidar system comprising:
recording, with a vehicle-mounted global positioning system-assisted inertial measurement unit (GPS/IMU) system, vehicle position and vehicle orientation data at particular points in time as the vehicle traverses a route;
generating a route topology based on the vehicle position and the vehicle orientation data;
recording a first upper limit horizon estimation and a first lower limit horizon estimation by the lidar system for at least one of the particular points in time;
determining a relative lidar system position and a relative lidar system orientation based on a relative location of the lidar system with respect to the GPS/IMU system;
calculating a second upper limit horizon estimation and a second lower limit horizon estimation for the lidar system for at least one of the particular points in time based on the route topology and the relative lidar system position and relative lidar system orientation; and
assessing an upper limit horizon estimation accuracy and a lower limit horizon estimation accuracy of the lidar system that is able to generate the first upper limit horizon estimation and the first lower limit horizon estimation faster than utilizing the GPS/IMU system to augment the calculation of the second upper limit horizon estimation and the second lower limit horizon estimation including by comparing for the at least one of the particular points in time the first upper limit horizon estimation with the second upper limit horizon estimation and comparing the first lower limit horizon estimation with the second lower limit horizon estimation to generate horizon accuracy metrics.

16. The method of claim 15, wherein the horizon accuracy metrics include upper horizon accuracy metrics and lower horizon accuracy metrics.

17. The method of claim 15, wherein: each of the particular points in time is associated with a particular frame of data captured by the lidar system.

18. The method of claim 15, wherein the route topology is based on the location of the lidar system on the vehicle.

19. The method of claim 15, wherein the route topology is a road surface route topology and the generation of the road surface route topology is further based on a location of the GPS/IMU system on the vehicle relative to the road surface.

20. The method of claim 15, wherein the GPS/IMU system vehicle position and vehicle orientation data is further based on real time kinematic (RTK) system correction data.

21. The method of claim 15, wherein the GPS/IMU system and the lidar system share a common time signal.

* * * * *